US012767020B2

(12) United States Patent
Yeo et al.

(10) Patent No.: US 12,767,020 B2
(45) Date of Patent: Oct. 20, 2026

(54) PNEUMATIC AND VIBRATION PROVIDING DEVICE FOR VEHICLE SEAT

(71) Applicant: HYUNDAI TRANSYS INC., Seosan-si (KR)

(72) Inventors: Seung Yun Yeo, Incheon (KR); Gu Chang Kang, Hwaseong-si (KR); Ui Jeong Lee, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 64 days.

(21) Appl. No.: 18/813,548

(22) Filed: Aug. 23, 2024

(65) Prior Publication Data

US 2025/0083581 A1 Mar. 13, 2025

(30) Foreign Application Priority Data

Sep. 13, 2023 (KR) ........................ 10-2023-0121492

(51) Int. Cl.
*B60N 2/90* (2018.01)
*B60N 2/66* (2006.01)

(52) U.S. Cl.
CPC ............. *B60N 2/665* (2015.04); *B60N 2/914* (2018.02); *B60N 2/976* (2018.02); *B60N 2002/981* (2018.02)

(58) Field of Classification Search
CPC ......... B60N 2/914; B60N 2/976; B60N 2/665
See application file for complete search history.

(56) References Cited

U.S. PATENT DOCUMENTS

| | | | | |
|---|---|---|---|---|
| 7,727,171 B2 * | 6/2010 | Ozaki | B60N 2/976 | 297/284.6 Z |
| 9,302,601 B2 * | 4/2016 | Worlitz | B60N 2/976 | |
| 9,981,587 B2 * | 5/2018 | Mizobata | B60N 2/80 | |
| 10,220,756 B2 * | 3/2019 | Onuma | A61H 23/04 | |
| 12,214,707 B2 * | 2/2025 | Blair | A61H 9/0071 | |
| 2006/0217644 A1 | 9/2006 | Ozaki et al. | | |
| 2016/0129920 A1 | 5/2016 | Hall et al. | | |
| 2020/0054518 A1 | 2/2020 | Noso et al. | | |

(Continued)

FOREIGN PATENT DOCUMENTS

| | | |
|---|---|---|
| CN | 214553053 U | 11/2021 |
| JP | 2018-47862 A | 3/2018 |

(Continued)

OTHER PUBLICATIONS

Request for the Submission of an Opinion dated Aug. 27, 2025 from Korea Application No. 10-2023-0121492.

(Continued)

*Primary Examiner* — Rodney B White

(74) *Attorney, Agent, or Firm* — Quantum Patent Law Firm; Seongyoune Kang

(57) ABSTRACT

The present disclosure provides a pneumatic and vibration providing device for a vehicle seat, the pneumatic and vibration providing device including a first air bladder mounted in a seatback and configured to be inflated and deflated in the seatback, and a vibration motor disposed on a front portion of the first air bladder and configured to selectively generate vibration, wherein the vibration motor has a fusion sheet provided on one surface side thereof, wherein the fusion sheet has an edge portion entirely fixed to the first air bladder by thermal fusion.

5 Claims, 6 Drawing Sheets

(56) References Cited

U.S. PATENT DOCUMENTS

| | | | | |
|---|---|---|---|---|
| 2023/0077600 | A1* | 3/2023 | Hirao | B60N 2/0025 297/284.6 |
| 2023/0145350 | A1* | 5/2023 | Ulmer | B60N 2/7005 297/217.3 |
| 2023/0373354 | A1* | 11/2023 | Kang | H02K 7/1166 |
| 2024/0246469 | A1* | 7/2024 | Cole | B60N 2/976 |
| 2025/0025365 | A1* | 1/2025 | Washington | A61H 23/02 |
| 2025/0196746 | A1* | 6/2025 | Lee | B60N 2/976 |

FOREIGN PATENT DOCUMENTS

| | | | |
|---|---|---|---|
| KR | 10-2024-0133103 | A | 9/2024 |
| KR | 10-2024-0136568 | A | 9/2024 |

OTHER PUBLICATIONS

Decision to Grant dated Jun. 17, 2026 from Korean Application No. 10-2023-0121492.

* cited by examiner

PNEUMATIC AND VIBRATION PROVIDING DEVICE FOR VEHICLE SEAT

CROSS-REFERENCE TO RELATED APPLICATION

This application claims, under 35 U.S.C. § 119(a), priority to Korean Patent Application No. 10-2023-0121492, filed on Sep. 13, 2023, the entire contents of which are incorporated herein by reference.

BACKGROUND

(a) Technical Field

The present disclosure relates to a pneumatic and vibration providing device for a vehicle seat, and more particularly, to a pneumatic and vibration providing device for a vehicle seat, configured to reduce motor noise and increase vibration transmission power.

(b) Background Art

In order to improve comfort performance for passengers having different body shapes and to provide a massage effect to passengers, recently, a pneumatic system is installed inside vehicle seats, such as in a seatback, a side bolster, and a seat cushion.

The pneumatic system usually includes an air bladder, a pump connected to the air bladder for intake and exhaust of air, and a valve to control a flow of air. The pneumatic system may provide a massage effect to passengers by repeatedly performing inflation and deflation of the air bladder by driving of the pump. Accordingly, it is possible to alleviate back pain, cervical pain, and shoulder pain caused by load on the passenger's waist and pelvis during long-term driving.

Furthermore, recently, a vehicle seat has a vibration system installed therein and disposed at a different location from an installation location of the pneumatic system. The vibration system includes a vibration motor, a connector connected to the vibration motor, and wiring. Further, the vibration system is driven in conjunction with vehicle information.

The vibration system may provide, to a driver, vibration for lane departure warning or driver inattention warning by driving the vibration motor based on the vehicle information. Accordingly, the driver may recognize the vibration warning and may safely drive a vehicle.

In addition, the vibration system provides, to a passenger seated in the seat, a massage effect by delivering vibrations having various intensities, thereby having an effect of relieving fatigue that occurs during long-term driving.

However, the pneumatic system and the vibration system are separately mounted in the vehicle seat and are disposed at different locations of the vehicle seat through a separate assembly process. Accordingly, there is a difficulty in appropriately disposing and installing the pneumatic system and the vibration system in the limited internal space of the seat. As a result, it may be difficult to efficiently provide a seat package.

Recently, research and development has been actively conducted on improvement in a seat package. For example, it is proposed to integrally mount the pneumatic system and the vibration system in the vehicle seat.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a pneumatic and vibration providing device for a vehicle seat, configured to perform stable operation of a vibration motor and to reduce noise of the vibration motor regardless of inflation and deflation of an air bladder.

FIG. 8 is a partial diagram showing a conventional pneumatic and vibration providing device for a vehicle seat.

As shown in FIG. 8, in order to efficiently provide a seat package, the conventional pneumatic and vibration providing device for a vehicle seat has a vibration motor 20 for a vibration system directly attached to the outer surface of an air bladder 10 for a pneumatic system.

However, since the vibration motor 20 is attached to the surface of the air bladder 10, the vibration motor 20 moves with the air bladder 10 during air intake and air exhaust of the air bladder 10. In this case, the vibration motor 20 moves unstably during operation thereof, resulting in a problem related to amplified noise.

Accordingly, it is required to additionally install a damper to reduce noise of the vibration motor or to apply a separate control logic to reduce noise, leading to an increase in costs.

The objects of the present disclosure are not limited to the above-mentioned objects, and other technical objects not mentioned herein will be clearly understood by those skilled in the art to which the present disclosure pertains from the detailed description of the embodiments.

In one aspect, the present disclosure provides a pneumatic and vibration providing device for a vehicle seat, the pneumatic and vibration providing device including a first air bladder mounted in a seatback and configured to be inflated and deflated in the seatback, and a vibration motor disposed on a front portion of the first air bladder and configured to selectively generate vibration, wherein the vibration motor has a fusion sheet provided on one surface side thereof, wherein the fusion sheet has an edge portion entirely fixed to the first air bladder by thermal fusion.

In an embodiment, the fusion sheet may be formed to extend wider than the one surface side of the vibration motor, and the edge portion of the fusion sheet may be bonded to, by the thermal fusion, the front portion of the first air bladder and a rear portion thereof.

In another embodiment, the fusion sheet may be molded using a thermoplastic polyurethane (TPU) material.

In still another embodiment, the pneumatic and vibration providing device may further include a second air bladder provided on a rear end surface of the first air bladder and configured to be inflated and deflated, wherein the second air bladder may be connected to the first air bladder so as to enable air to flow therebetween.

In yet another embodiment, the rear portion of the first air bladder may have a first bladder connection portion and the front portion of the second air bladder may have a second bladder connection portion, wherein the rear portion of the first air bladder and the front portion of the second air bladder may be coupled to each other through the thermal fusion of the first and second bladder connection portions performed at an outer location of the vibration motor, and the first and second bladder connection portions may have first and second air communication ports each formed to be perforated at central portions of the first and second bladder connection portions and configured to enable the air to flow between the first air bladder and the second air bladder.

Other aspects and embodiments of the disclosure are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
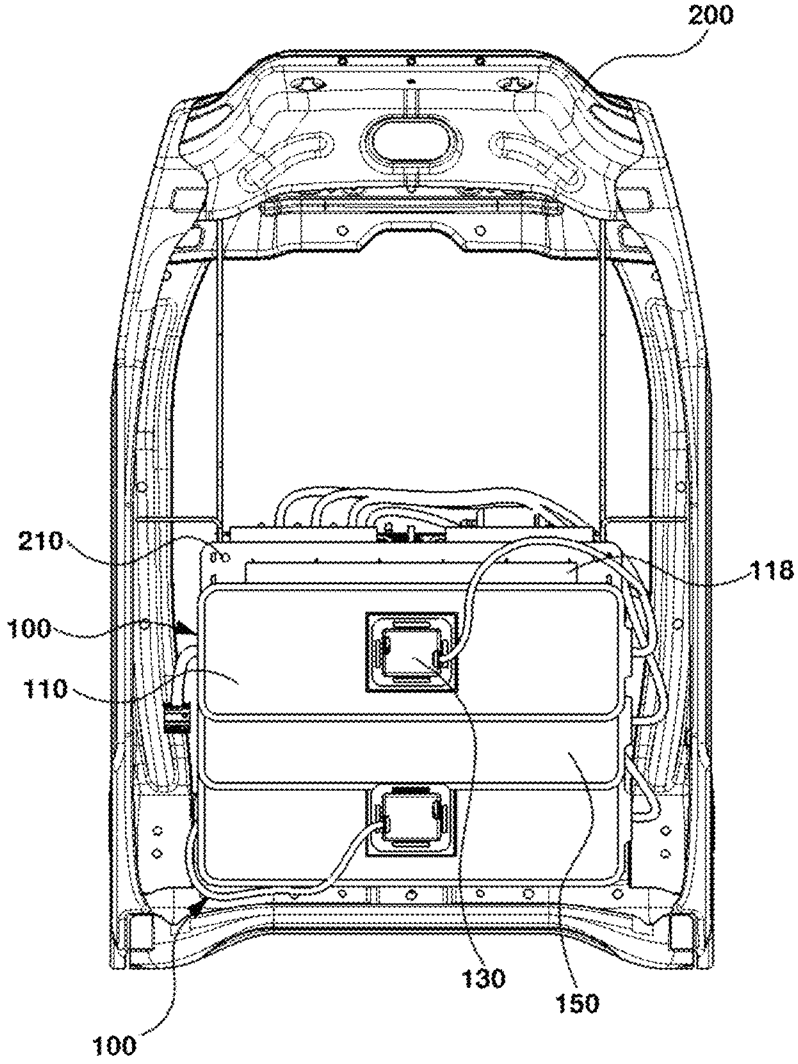
FIGS. 1 and 2 are views each showing a state in which a pneumatic and vibration providing device according to an embodiment of the present disclosure is mounted on a frame of a vehicle seat.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. Further, the matters represented in the accompanying drawings are schematically illustrated in order to easily explain the embodiments of the present disclosure, and may be different from actually implemented forms.

Meanwhile, in the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

Additionally, in this specification, a forward-and-rearward direction, a left-and-right direction, and an upward-and-downward direction may be described in consideration of a vehicle and a seat provided in the vehicle, unless clearly specified otherwise in context.

Figure 2:
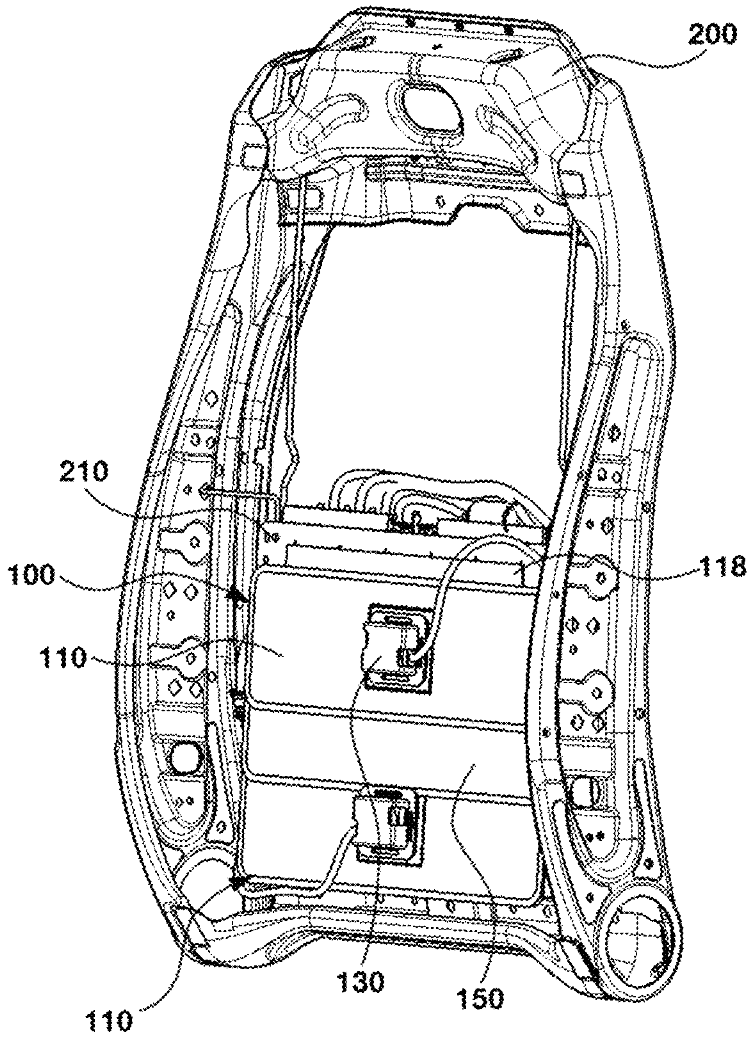

As shown in FIGS. 1 and 2, a pneumatic and vibration providing device for a vehicle seat 100 according to an embodiment of the present disclosure is mounted on a seatback frame 200 of the vehicle seat and is supported by the seatback frame 200 so as to be driven thereon. The seatback frame 200 may have a plurality of pneumatic and vibration providing devices 100 mounted thereon.

Figure 3:
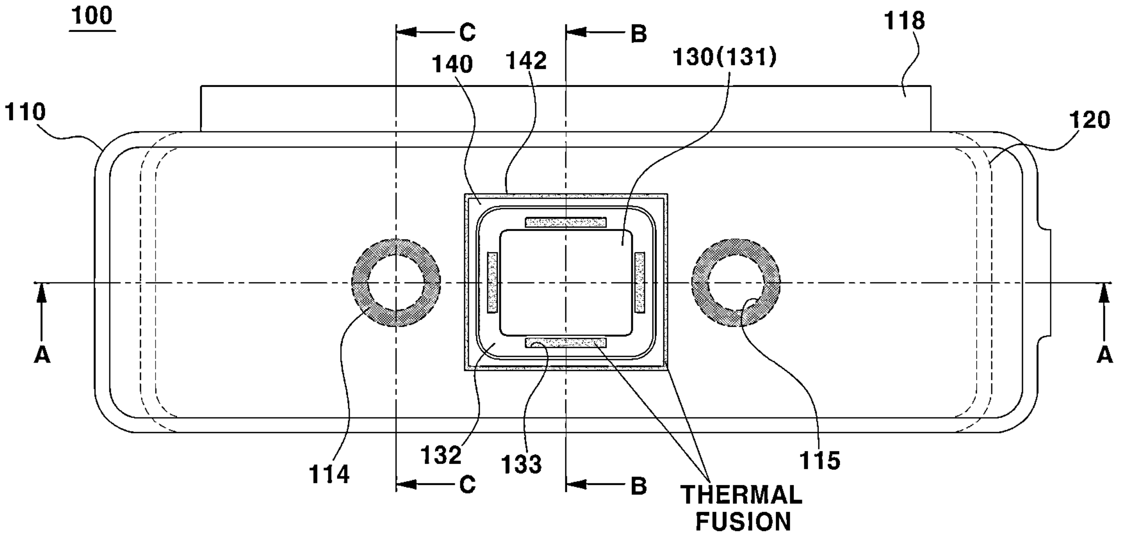
FIG. 3 is a plan view showing the pneumatic and vibration providing device according to the embodiment of the present disclosure.
Figure 4:
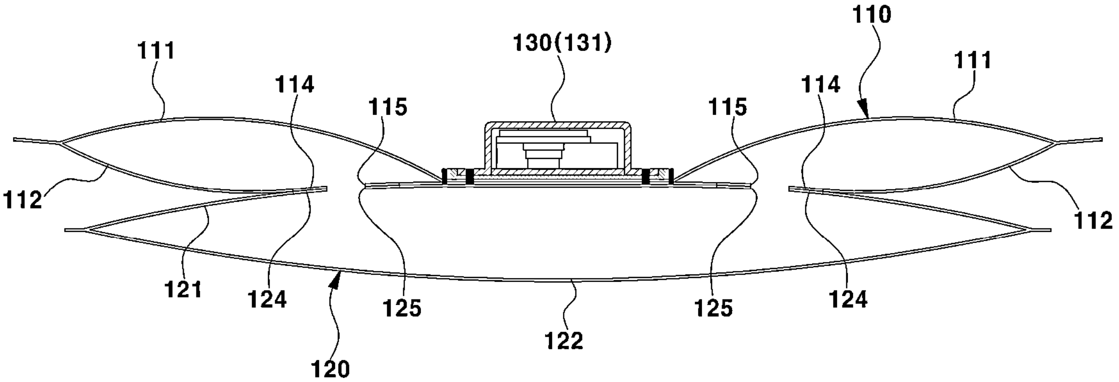
FIG. 4 is a view taken along line A-A in FIG. 3.

Referring to FIGS. 3 and 4, the pneumatic and vibration providing device for the vehicle seat 100 according to the embodiment of the present disclosure includes a first air bladder 110, a second air bladder 120, and a vibration motor 130.

The first air bladder 110 is a component of a pneumatic system adapted to provide a massage effect and a support effect by air pressure near the passenger's waist. At least two or more first air bladders 110 may be provided inside a seatback and may be disposed spaced apart from each other in the vertical direction.

Although not shown in the drawing, the pneumatic system may include, in addition to the first air bladder 110, a pump for air intake and air exhaust of the first air bladder 110 and a valve adapted to control a flow of air between the first air bladder 110 and the pump.

Referring to FIGS. 1 and 2, the first air bladder 110 is mounted on the seatback frame 200 provided inside the seatback and is supported by the seatback frame 200 so as to be driven thereon. That is, the first air bladder 110 is mounted in the seatback so as to be inflated and to restore the original shape thereof (or to be deflated) therein. The first air bladder 110 may be disposed between the seatback frame 200 and a seatback pad (not shown) disposed in front of the seatback frame 200.

The vibration motor 130 is a component of a vibration system configured to provide, to a passenger, a massage effect or give a predetermined alarm and warning by transmitting vibrations having various intensities. Here, the vibration motor 130 is mounted at a predetermined location on the outer surface of the first air bladder 110. The vibration motor 130 may supplement the massage effect of the first air bladder 110 by controlling the driving speed thereof.

Referring to FIGS. 3 and 4, the vibration motor 130 is stacked and disposed on a front portion 111 of the first air bladder 110 and is configured to selectively generate and provide vibration. Although not shown in the drawing, the vibration motor 130 may be controlled by a controller configured to perform overall control of the vibration system.

The vibration motor 130 has a fusion sheet 140 provided on one surface side thereof (that is, the surface facing the front side of the first air bladder) and coupled to the first air bladder 110. The vibration motor 130 includes a motor housing 131 surrounding components configured to generate and provide vibration, and the fusion sheet 140 may be attached and fixed to one surface side of the motor housing 131.

The fusion sheet 140 is fixed to the front portion 111 of the first air bladder 110 through thermal fusion. To this end, the fusion sheet 140 may be injection molded using a thermoplastic polyurethane (TPU) material.

The fusion sheet 140 is formed to extend from one surface side of the motor housing 131 in all directions. The fusion sheet 140 may be formed to extend wider than the one surface side of the motor housing 131. The fusion sheet 140 may be formed as a sheet type having a width greater than one surface side of the motor housing 131 and a predetermined thickness. One surface side of the motor housing 131 may be bonded to and disposed at a central portion of the fusion sheet 140.

The motor housing 131 is made of a hard material such as plastic or rubber to protect built-in parts and is thermally fused to the front portion 111 of the first air bladder 110 through the fusion sheet 140.

In this case, an edge portion 142 of the fusion sheet 140 is fixed to the central portion of the first air bladder 110 by thermal fusion. Referring to FIG. 3, the edge portion 142 of the fusion sheet 140 is entirely fused to the first air bladder 110. Accordingly, the fusion sheet 140 is fused to the first air bladder 110 through the edge portion 142 having a closed loop shape (for example, a square shape).

Figure 5:
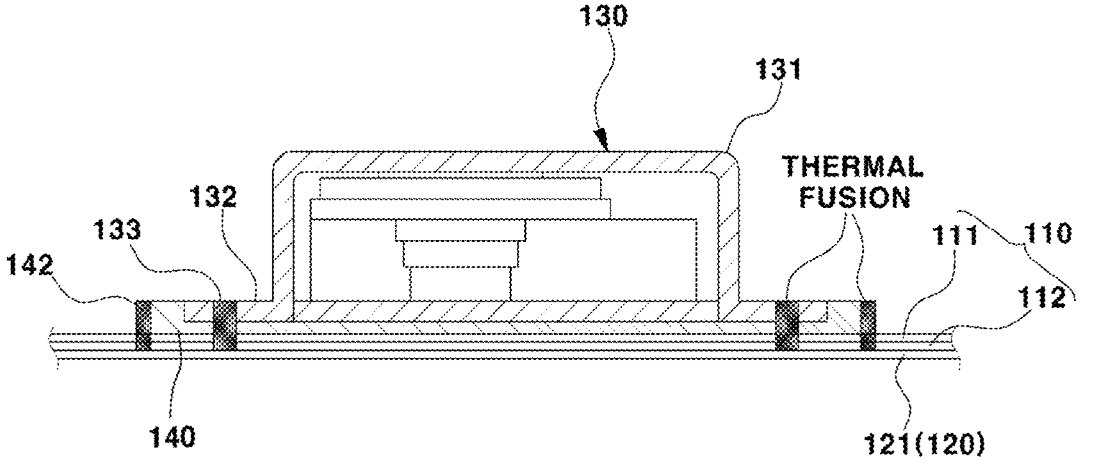
FIG. 5 is an enlarged view of a portion of FIG. 4.

In addition, the fusion sheet 140 is thermally fused to the first air bladder 110 in a non-inflated state. Accordingly, as shown in FIG. 5, the first air bladder 110 is simultaneously fused and fixed to both the front portion 111 of the first air bladder 110 and a rear portion 112 thereof. That is, the fusion sheet 140 is bonded to not only the front portion 111 of the first air bladder 110 but also the rear portion 112 of the first air bladder 110 by thermal fusion.

In this manner, the vibration motor 130 is fused in a closed loop structure sealed at the central portion of the first air bladder 110 through thermal fusion using the fusion sheet 140. Accordingly, a central area of the first air bladder 110 where the vibration motor 130 is located becomes a sealed non-inflation section.

Figure 6:
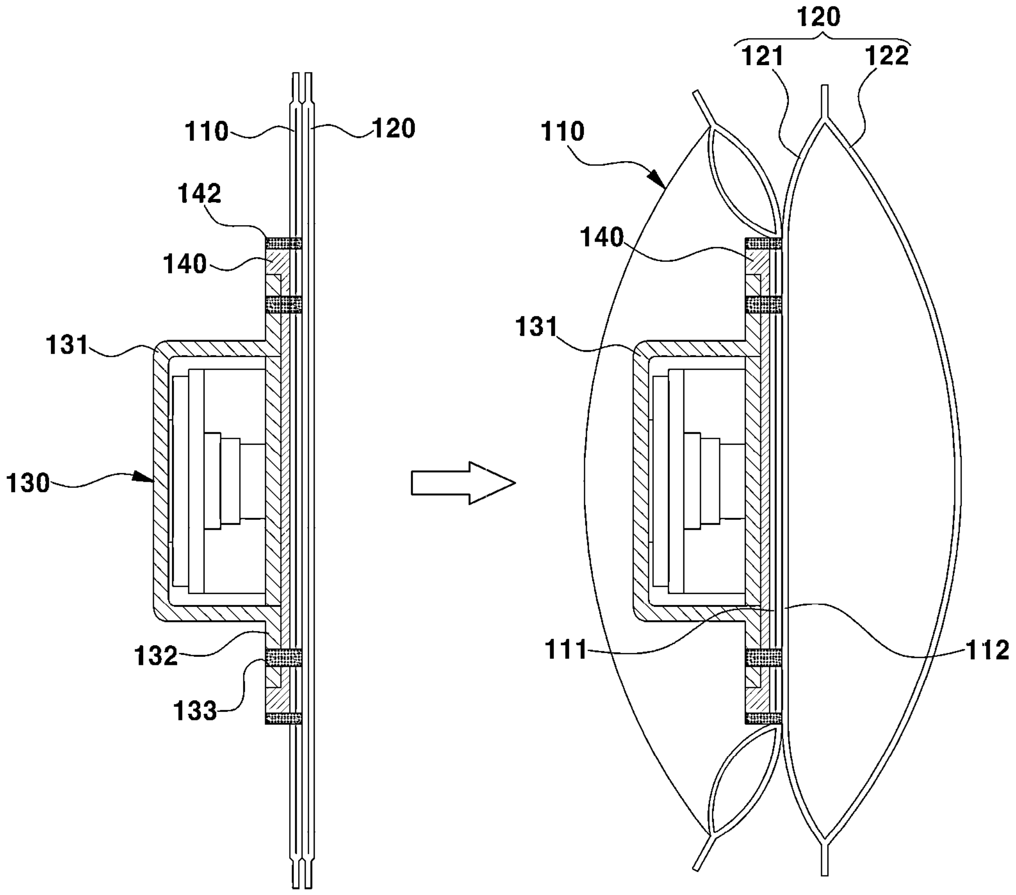
FIG. 6 is a view taken along line B-B in FIG. 3 and shows a state before and after inflation of an air bladder.

Accordingly, as shown in FIG. 6, even if air is supplied into and is discharged from the first air bladder 110, the central area of the first air bladder 110 (that is, the area in which the vibration motor is stacked and located) does not allow air to be introduced thereinto or discharged therefrom. As a result, the central area constantly maintains a flat shape and a flat state, thereby making it possible to prevent unstable operation of the vibration motor 130 and noise amplification due to inflation and deflation of the first air bladder 110. In addition, since there is no need for separate control or a component such as a damper to reduce noise of the vibration motor 130, additional costs may be reduced.

In addition, the first air bladder 110 supplies air to an upper area of the vibration motor 130 and a lower area thereof. However, an inflation amount at the upper and lower areas is not as large as an inflation amount at the left and right areas.

Additionally, in order to perform more stable bonding, the fusion sheet 140 may be thermally fused to the first air bladder 110 in an area in which the fusion sheet 140 overlaps the motor housing 131.

To this end, as shown in FIGS. 3 and 5, the motor housing 131 has an extension plate portion 132 provided on one surface side thereof and formed to extend and protrude in all directions of the motor housing 131. The extension plate portion 132 has a fusion hole 133 provided therein and configured to allow the fusion sheet 140 to be thermally fused to the first air bladder 110 therethrough.

The fusion sheet 140 may be directly fused to the first air bladder 110 in an area opened through the fusion hole 133. A plurality of the fusion holes 133 may be provided in the extension plate portion 132 and may be spaced apart from each other in the circumferential direction of the vibration motor 130.

Meanwhile, when the central area of the first air bladder 110 is sealed and non-inflated, the inflation amount of the first air bladder 110 may be insufficient. Accordingly, the second air bladder 120 is further provided to supplement the inflation amount of the first air bladder 110.

As described above, the second air bladder 120 is provided to supplement the inflation amount of the first air bladder 110, thereby increasing vibration transmission power of the vibration motor 130 to a passenger.

The second air bladder 120 is attached to and provided on the rear end surface of the first air bladder 110 (that is, the outer surface of the rear portion 112). The second air bladder 120 is stacked on the rear end surface of the first air bladder 110 in the forward-and-rearward direction. Further, the second air bladder 120 is connected to the first air bladder 110 to allow air to flow therebetween, thereby sharing an air flow path.

Figure 7:
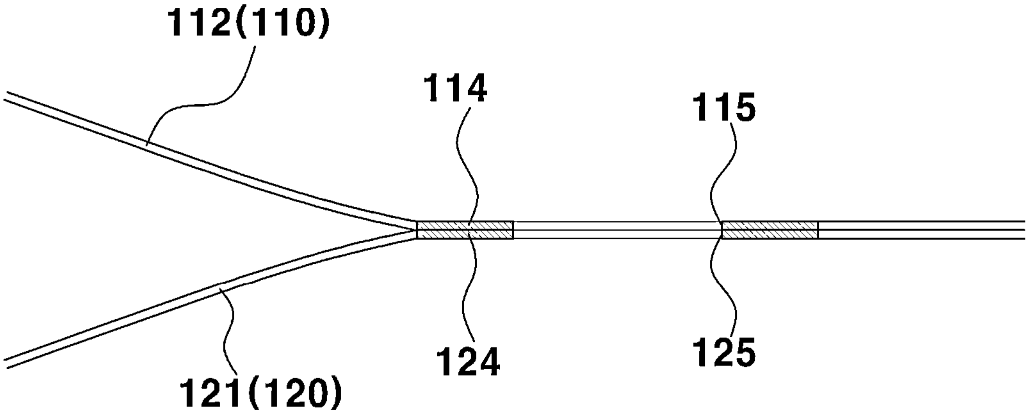
FIG. 7 is a view taken along line C-C in FIG. 3.
Figure 8:
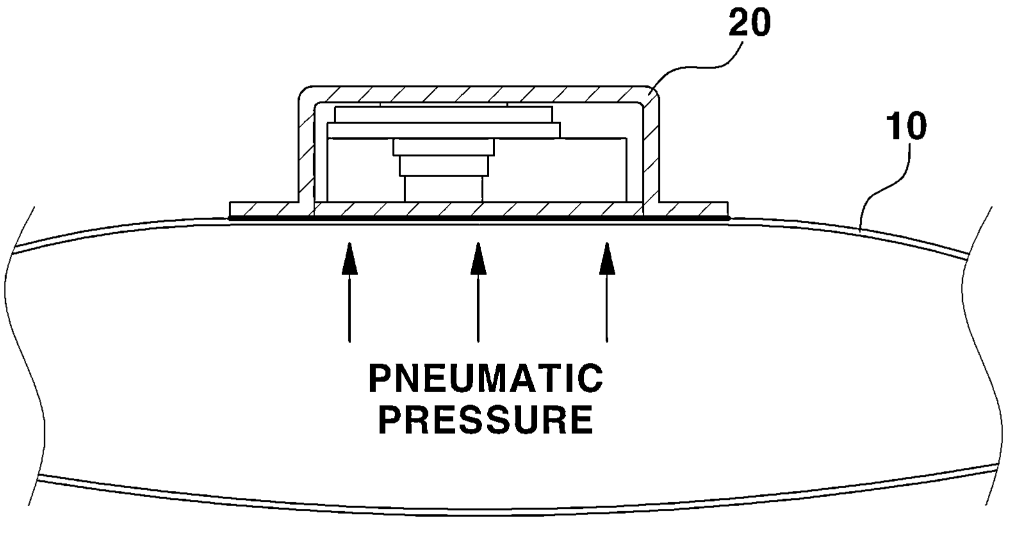
FIG. 8 is a view showing a conventional pneumatic and vibration providing device for a vehicle seat.

The second air bladder 120 is located at the rear end surface of the first air bladder 110 and is mounted inside the seatback so as to be inflated and deflated therein. As shown in FIGS. 4 and 7, the first air bladder 110 and first and second air communication ports 115, 125 are connected to each other so as to allow air to flow therebetween.

The rear portion 112 of the first air bladder 110 has a first bladder connection portion 114 and the front portion 121 of the second air bladder 120 has a second bladder connection portion 124. The rear portion 112 of the first air bladder 110 and the front portion 121 of the second air bladder 120 are coupled to each other through thermal fusion of the first and second bladder connection portions 114, 124 performed at an outer location of the vibration motor 130 (that is, a location at which the vibration motor is not stacked).

The first and second bladder connection portions 114, 124 are respectively provided on the left and right sides of the air bladders 110 and 120 relative to the vibration motor 130. Further, the first and second bladder connection portions 114, 124 are a portion at which the rear portion 112 of the first air bladder 110 and the front portion 121 of the second air bladder 120 are directly thermally fused.

The first and second bladder connection portions 114,124 have the first and second air communication ports 115,125 provided each at central portion thereof in a radial direction and configured to allow air to flow between the first air bladder 110 and the second air bladder 120. In other words, the first and second bladder connection portions 114, 124 are portions that are thermally fused along the circumference of the first and second air communication ports 115,125 at the rear portion 112 of the first air bladder 110 and the front portion 121 of the second air bladder 120.

As described above, the first and second air communication ports 115, 125 are provided, thereby enabling air to be supplied to both the first air bladder 110 and the second air bladder 120 even if only one of the first air bladder 110 and the second air bladder 120 is connected to an air supply pump (not shown).

Reference numeral 122, which is not described above, refers to a rear portion 122 of the second air bladder 120, and reference numeral 210 refers to a felt 210.

Referring to FIGS. 1 and 2, the pneumatic and vibration providing device 100 according to the embodiment of the present disclosure may be mounted on the seatback frame 200 through the felt 210. The first air bladder 110 may be coupled to the felt 210 through a felt fusion portion 118 provided on the upper end of the felt 210.

In addition, reference numeral 150, which is not described in FIG. 1, refers to an air bladder 150 in which the vibration motor 130 is not provided.

As is apparent from the above description, the present disclosure provides the following effects.

First, a vibration motor is bonded to a first air bladder by thermal fusion so as not to be affected by operation of the first air bladder, thereby making it possible to prevent unstable operation of the vibration motor and noise amplification thereof due to inflation and deflation of the first air bladder.

Second, there is no need for a separate damper or separate control logic to reduce noise of the vibration motor, thereby reducing additional costs.

Third, a second air bladder is provided at the rear end surface of the first air bladder so as to supplement an inflation amount of the first air bladder, and the forward and rearward positions of the vibration motor are adjusted and changed depending on the inflation amount of the second air bladder, thereby making it possible to control intensity of vibration transmitted to a passenger.

Fourth, both pneumatic pressure of the air bladder and vibration of the vibration motor may provide a massage effect to a passenger, thereby maximally improving passenger comfort performance.

Fifth, the air bladder for the pneumatic system and the vibration motor for the vibration system are formed to be integrated with each other, thereby reducing a seat package size and improving seat marketability.

The effects of the present disclosure are not limited to the above-mentioned effects, and other effects not mentioned herein will be clearly understood by those skilled in the art from the detailed description of the embodiments.

As described above, the embodiments of the present disclosure have been described in detail, and the terms or words used in this specification and claims shall not be construed as being limited to typical or dictionary meanings. In addition, since the embodiments described in this specification and the configurations shown in the drawings are only embodiments of the present disclosure, the scope of the present disclosure is not limited to the above-described embodiments. Various modifications and improvements made by those skilled in the art using the basic concept of the present disclosure defined in the following claims also fall within the scope of the present disclosure.

What is claimed is:

1. A pneumatic and vibration generating device for a vehicle seat, the pneumatic and vibration generating device comprising:

a first air bladder mounted in a seatback and configured to be inflated and deflated in the seatback; and a vibration motor disposed on a front portion of the first air bladder and configured to selectively generate vibration, wherein the vibration motor has a fusion sheet provided on one surface side thereof, wherein the fusion sheet has an edge portion entirely fixed to the first air bladder by thermal fusion, wherein the fusion sheet is formed to extend wider than the one surface side of the vibration motor, and the edge portion of the fusion sheet is bonded to, by the thermal fusion, a front portion of the first air bladder and a rear portion of the first air bladder in a non-inflated state, and wherein the one surface side of the vibration motor is disposed at a central portion of the fusion sheet, and the edge portion extends in a closed loop shape along the perimeter of the fusion sheet.

2. The pneumatic and vibration generating device of claim 1, wherein the fusion sheet is molded using a thermoplastic polyurethane (TPU) material.

3. The pneumatic and vibration generating device of claim 1, further comprising a second air bladder provided on a rear end surface of the first air bladder and configured to be inflated and deflated, wherein the second air bladder is operatively connected to the first air bladder so as to enable air to flow therebetween.

4. The pneumatic and vibration generating device of claim 3, wherein a rear portion of the first air bladder has a first bladder connection portion and a front portion of the second air bladder has a second bladder connection portion, wherein the rear portion of the first air bladder and the front portion of the second air bladder are coupled to each other through the thermal fusion of the first and second bladder connection portions performed at an outer location of the vibration motor, and the first and second bladder connection portions have first and second air communication ports each formed to be perforated at central portions of the first and second bladder connection portions and configured to enable the air to flow between the first air bladder and the second air bladder.

5. A pneumatic and vibration generating device for a vehicle seat, the pneumatic and vibration generating device comprising:

a first air bladder mounted in a seatback and configured to be inflated and deflated in the seatback;

a vibration motor disposed on a front portion of the first air bladder and configured to selectively generate vibration; and wherein the vibration motor has a fusion sheet provided on one surface side thereof, wherein the fusion sheet has an edge portion entirely fixed to the first air bladder by thermal fusion, and wherein a rear portion of the first air bladder has a first bladder connection portion and a front portion of the second air bladder has a second bladder connection portion, wherein the rear portion of the first air bladder and the front portion of the second air bladder are coupled to each other through the thermal fusion of the first and second bladder connection portions performed at an outer location of the vibration motor, and the first and second bladder connection portions have first and second air communication ports each formed to be perforated at central portions of the first and second bladder connection portions and configured to enable the air to flow between the first air bladder and the second air bladder, a second air bladder provided on a rear end surface of the first air bladder and configured to be inflated and deflated, wherein the second air bladder is operatively connected to the first air bladder so as to enable air to flow therebetween, wherein the vibration motor has a fusion sheet provided on one surface side thereof, wherein the fusion sheet has an edge portion entirely fixed to the first air bladder by thermal fusion, and wherein a rear portion of the first air bladder has a first bladder connection portion and a front portion of the second air bladder has a second bladder connection portion, wherein the rear portion of the first air bladder and the front portion of the second air bladder are coupled to each other through the thermal fusion of the first and second bladder connection portions performed at an outer location of the vibration motor, and the first and second bladder connection portions have first and second air communication ports each formed to be perforated at central portions of the first and second bladder connection portions and configured to enable the air to flow between the first air bladder and the second air bladder.

* * * * *